Patented Feb. 24, 1925.

1,527,869

UNITED STATES PATENT OFFICE.

MAX HARTMANN AND HANS KÄGI, OF BASEL, SWITZERLAND, ASSIGNORS TO SOCIETY OF CHEMICAL INDUSTRY IN BASLE, OF BASEL, SWITZERLAND.

DISPERSED SYSTEM AND PROCESS OF MAKING SAME.

No Drawing. Application filed November 7, 1924. Serial No. 748,483.

*To all whom it may concern:*

Be it known that we, MAX HARTMANN and HANS KÄGI, both citizens of the Swiss Confederation, and residing at Basel, Switzerland, have invented new and useful Dispersed Systems and Processes of Making Same, of which the following is a full, clear, and exact specification.

The present invention relates to a process of making dispersed systems by using as dispersing agent aqueous solutions of salts of mono- or unilaterally diacylated diamines. The invention comprises the method of making these dispersed systems as well as the dispersed systems themselves.

We have found that mono- and unilaterally diacylated diamines, as for instance those described in U. S. specification Serial No. 615,937 and Serial No. 723,795 show, in form of the aqueous solutions of their salts, the remarkable capacity to convert compounds insoluble or with difficulty soluble in water very easily, i. e., with expense of very little energy, into the dispersed state and to maintain this latter for a long time. The degree of dispersion reached by this process varies according to the method of preparation from that of a coarse emulsion to that of a colloidal solution. These salt solutions may behave partly also as remarkable protective colloids for the manufacture of colloidal solutions by chemical reactions, as for instance for the preparation of gold, platinum, silver chloride solutions, etc.

Some of these compounds besides the atypical (colloidal-peptic) dissolving power show also a typical (molecular) one.

Example 1.

An aqueous solution of the hydrochloric salt of the dimenthylester of diethylamino-ethylimino-dicarboxylic acid of 3⅓ per cent strength is shaken vigorously for some seconds with the same volume of the solution of camphor of 20 per cent strength in olive oil, which has been brought by halogenation to the same specific weight as the aqueous solution (1,0025 at 17.5° C.). A milky emulsion is formed with particles of 5 μ diameter on an average. This emulsion is stable for years without alteration, whereas one obtained by means of ordinary camphor oil creams after some time, without, however, losing its dispersity.

Example 2.

10 parts of a solution containing 10 per cent of the hydrochloric salt of linoleyl-diethyl-ethylene-diamide are shaken for some time with one part of m-cresol. A colloidal milky liquid is thus obtained which may be diluted with water in any proportion.

Example 3.

A solution containing 10% of the hydrochloride of the dicyclohexylcarbinolester of diethylamino-ethylimino-dicarboxylic acid (prepared from 1 molecular proportion of diethyl-ethylenediamine and 2 molecular proportions of the hexahydrobenzyl-ester of chloroformic acid, boiling point 167° C. at 0.008 mm.) is shaken for several hours with an excess of camphor. The decanted liquid contains 2.25% of camphor (water only dissolves 0.15% of camphor).

Example 4.

10 parts of a solution containing 10% of the hydrochloride of oleyl-diethyl-ethylene-diamide are mixed with 4 parts of a solution of silver nitrate of 10 per cent strength. A milky, jelly-like mass is thus obtained yielding by addition of water a solution of silver chloride which is clear in transmitted light, opalescent in reflected light.

Example 5.

A solution containing 10% of the hydrochloride of palmityl-diethyl-ethylene-diamide is shaken with half of its volume of olive oil, a stable emulsion being thus obtained.

Example 6.

100 parts of a solution containing 1 part of silver are heated to boiling temperature after addition of 8 parts of a solution containing 10% of oleyl-diethyl-ethylene-diamide-acetate and treated with a solution of 4 parts of hypophosphorous acid of about 50 per cent strength and 1.5 parts of sodium acetate in 80 parts of water. After a short ebullition, the liquid is cooled and then dialysed. The colloidal silver solution thus obtained forms a coffee-brown liquid.

*Example 7.*

70 parts of anhydrous lanoline are melted, mixed with 30 parts of a 50% solution of oleyl-diethyl-ethylene-diamide-hydrochloride and stirred until cold. An unguent easy to spread is thus obtained which may be easily removed from the skin by means of water.

*Example 8.*

Equal volumes of a solution containing 10% of oleyl-diethyl-ethylene-diamide-hydrochloride and fish oil which latter has previously been treated with halogen are vigorously shaken for some time. A stable very finely divided emulsion is thus obtained.

What we claim is:

1. A process for the manufacture of dispersed systems, which consists in using as dispersing agent solutions of salts of acylated diamines.

2. A process for the manufacture of dispersed systems, which consists in using as dispersing agent aqueous solutions of salts of acylated diamines.

3. A process for the manufacture of dispersed systems, which consists in using as dispersing agent solutions of salts of unilaterally acylated diamines.

4. A process for the manufacture of dispersed systems, which consists in using as dispersing agent aqueous solutions of salts of unilaterally acylated diamines.

5. As new articles of manufacture dispersed systems containing as dispersing agents solutions of salts of acylated diamines.

6. As new articles of manufacture dispersed systems containing as dispersing agents aqueous solutions of salts of acylated diamines.

7. As new articles of manufacture dispersed systems containing as dispersing agents solutions of salts of unliterally acylated diamines.

8. As new articles of manufacture dispersed systems containing as dispersing agents aqueous solutions of salts of unilaterally acylated diamines.

9. As a new article of manufacture a stable emulsion of camphor wherein a solution of camphor in halogenated oil is dispersed with an aqueous solution of the hydrochloric salt of the dimenthylester of diethylamino-ethylimino-dicarboxylic acid.

In witness whereof we have hereunto signed our names this 25th day of October, 1924, in the presence of two subscribing witnesses.

MAX HARTMANN.
HANS KÄGI.

Witnesses:
 JOSEPH SÜTTERLY,
 JOSEPH RIEK.